UNITED STATES PATENT OFFICE.

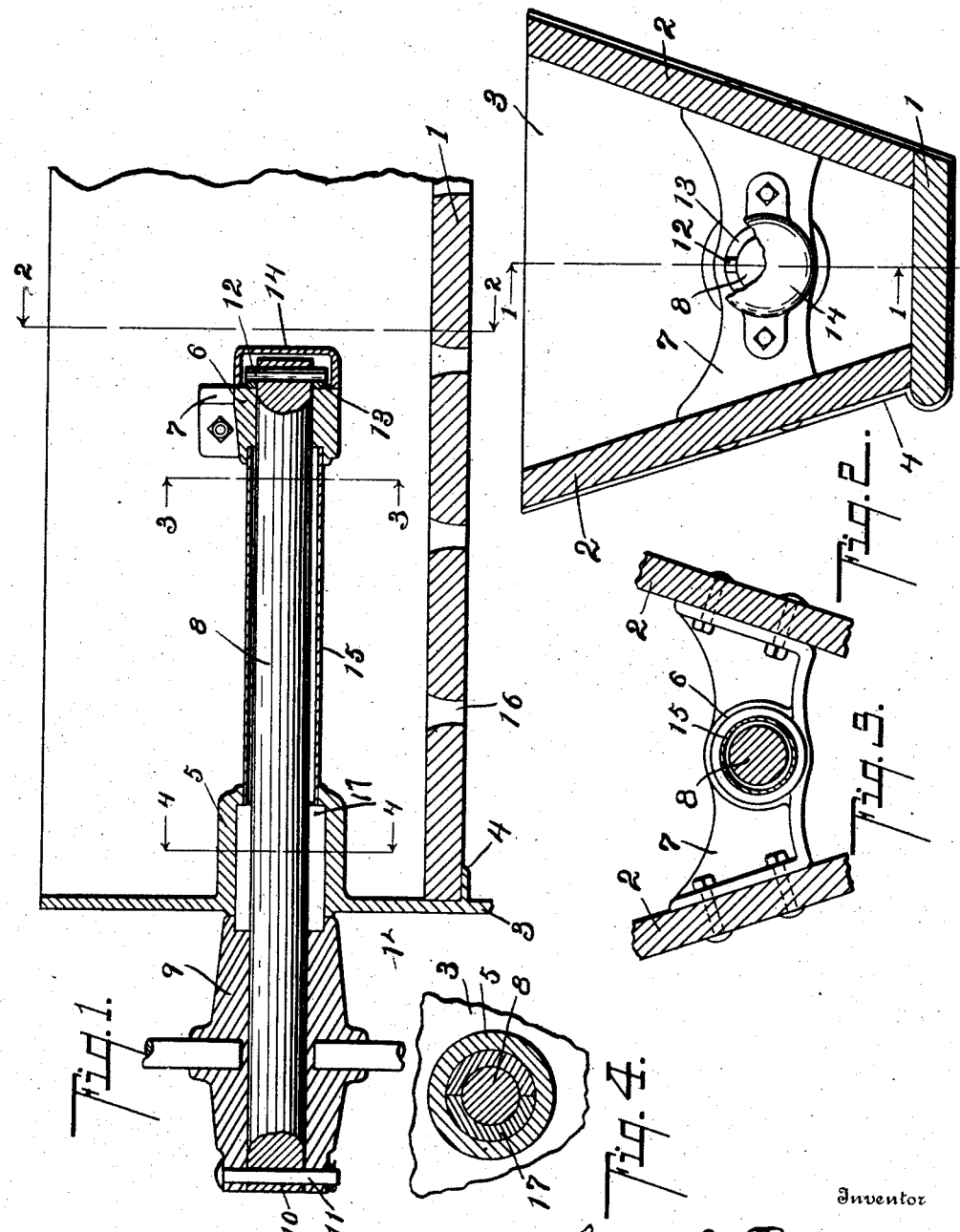

CHARLES L. FOWLE, OF DOWAGIAC, MICHIGAN, ASSIGNOR TO THE DOWAGIAC MANUFACTURING COMPANY, OF DOWAGIAC, MICHIGAN.

AXLE AND BEARING FOR GRAIN-SEEDING MACHINES.

No. 883,709.   Specification of Letters Patent.   Patented April 7, 1908.

Application filed January 2, 1908. Serial No. 408,896.

*To all whom it may concern:*

Be it known that I, CHARLES L. FOWLE, a citizen of the United States, residing at Dowagiac, Cass county, State of Michigan, have invented certain new and useful Improvements in Axles and Bearings for Grain-Seeding Machines, of which the following is a specification.

This invention relates to improvements in axles and bearings therefor.

My improved axle and bearing is particularly desirable and is especially designed by me for use in seeding machines and grain drills, although it may be adapted for use in other relations.

Seeding machines and grain drills are usually carried by two carrying-wheels, and some of these machines are very wide, particularly the class known as broadcast seeders, which are usually from eleven to fourteen feet in width. The result is that great strains are placed upon the carrying-wheels on account of the wabbling motion of the machine when in use, resulting in rapid wear especially in the common type where the wheels revolve on fixed axles or spindles.

The main object of this invention is to provide an improved axle and bearings for the carrying-wheels of seeding machines and grain drills, which is very strong and rigid, and also one which is very durable.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a detail longitudinal section of a structure embodying the features of my invention, taken on a line corresponding to line 2—2 of Fig. 2; Fig. 2 is a cross section, taken on a line corresponding to line 2—2 of Fig. 1, a portion of the dust cap of the inner bearing being broken away to show structural details; Fig. 3 is a detail cross section, taken on a line corresponding to line 3—3 of Fig. 1; Fig. 4 is a detail cross section, taken on a line corresponding to line 4—4 of Fig. 1.

In the drawing, the sectional views are taken looking in the direction of the little arrows at the ends of the section lines, and similar numerals of reference refer to similar parts throughout the several views.

Referring to the drawing, I have illustrated portions of a grain box comprising a bottom 1; side walls 2; and end walls 3. The end wall is preferably formed of castiron and is provided with an inwardly-projecting supporting flange 4 for the bottom and sides of the box. On the end of the box, and preferably cast integral therewith, is a bearing 5. This bearing is preferably arranged to project into the box so that it clears the bottom thereof. In the box, and in alinement with the bearing 5, I arrange an inner bearing 6. This inner bearing is preferably supported by a bracket 7 secured to the side walls of the box, so that it is supported clear of the bottom.

The axle 8 is preferably of uniform diameter from end to end, so that either end may be inserted in the bearings, the outer end being adapted to receive a wheel, as 9. The axle 8 is preferably provided with a transverse hole 10 at each end, the hole in the outer end of the axle serving to receive the key or pin 11 by which the wheel is secured to the axle. The hole in the inner end of the axle, which is arranged so as to project through the inner bearing receives the retaining pin 12, a thrust washer 13 being arranged between the pin and the bearing. This prevents the withdrawal of the axle. Should the axle become worn, it can be readily reversed.

The dust cap 14 is provided for the inner bearing and is preferably adapted to retain the pin 12. This dust cap is preferably adapted to receive such inthrust as there may be on the axle when a pin or other retaining means are not employed at the outer ends of the axle. Between the bearings, I arrange a housing 15 for the axle, this housing being preferably in the form of a pipe with its ends inserted in the bearing, so that it is carried thereby. This forms an effective protection for the axle from the grain and dust; and, by arranging the axle as I have described, it does not in any way interfere with the feeding of the grain through the discharge openings 16 in the bottom of the grain box. The bearing 5 is preferably provided with a bushing 17, the bushing illustrated being formed in sections. This bushing is adapted to be inserted into the bearing from the outer end thereof. By thus forming and arranging the parts, I secure a bearing which is capable of carrying very heavy loads, and one which is very durable; at the same time, it is not expensive to produce, and, should the axle for one of the bearings become worn, it may be readily renewed.

Having thus described my invention, what I claim as new and desire to secure by Letters Patent is:

1. The combination with a grain box, comprising a bottom, sides and an end; a bearing on said box end, projecting into said box clear of the bottom thereof; an inner bearing arranged in said box in alinement with said bearing on said end; a supporting bracket for said inner bearing secured to the side walls of said box whereby said bearing is supported clear of the bottom of the box; an axle having a transverse hole through each end thereof, whereby either end may be arranged in said bearings, with its end projecting through the inner bearing, its outer end being adapted to receive a wheel; a retaining pin arranged through the hole in the inner end of said axle; a dust cap for said inner bearing adapted to retain said pin; and a tubular housing for said axle arranged between said bearings and carried thereby.

2. The combination with a grain box, comprising a bottom, sides and an end, of a bearing on said box, projecting into said box clear of the bottom thereof; an inner bearing arranged in said box in alinement with said bearing on said end; a supporting bracket for said inner bearing secured to the side walls of said box whereby said bearing is supported clear of the bottom of the box; an axle having a transverse hole through each end thereof, whereby either end may be arranged in said bearings, with its end projecting through the inner bearing, its outer end being adapted to receive a wheel; and a retaining pin arranged through the hole in the inner end of said axle.

3. The combination with a grain box, comprising an end, of a bearing on said box end; an inner bearing arranged in said box in alinement with said bearing on said end; an axle, having a transverse hole through each end thereof, whereby either end may be arranged in said bearings, with its end projecting through the inner bearing, its outer end being adapted to receive a wheel; a retaining pin arranged through the hole in the inner end of said axle; a dust cap for said inner bearing adapted to retain said pin; and a tubular housing for said axle arranged between said bearings and carried thereby.

4. The combination with a grain box, comprising an end, of a bearing on said box end; an inner bearing arranged in said box in alinement with said bearing on said end; an axle having a transverse hole through each end thereof, whereby either end may be arranged in said bearings, with its end projecting through the inner bearing, its outer end being adapted to receive a wheel; a retaining pin arranged through the hole in the inner end of said axle; a dust cap for said inner bearing adapted to retain said pin; and a tubular housing for said axle arranged between said bearings and carried thereby.

5. The combination with a grain box, comprising an end; of a bearing on said box end; an inner bearing arranged in said box in alinement with said bearing on said end; an axle having a transverse hole through each end thereof, whereby either end may be arranged in said bearings, with its end projecting through the inner bearing, its outer end being adapted to receive a wheel; a retaining pin arranged through the hole in the inner end of said axle; and a tubular housing for said axle arranged between said bearings.

6. The combination with a grain box, comprising a bottom, sides and an end; a bearing on said box end, projecting into said box clear of the bottom thereof; an inner bearing arranged in said box in alinement with said bearing on said end; a supporting bracket for said inner bearing secured to the side walls of said box whereby said bearing is supported clear of the bottom of the box; an axle arranged in said bearings with its inner end projecting through the inner bearing; means for retaining said axle in said bearings arranged on the inner end thereof; a dust cap for said inner bearing adapted to inclose said retaining means; and a housing for said axle arranged between said bearings and carried thereby.

7. The combination with a grain box, comprising a bottom, sides and an end; a bearing on said box end, projecting into said box clear of the bottom thereof; an inner bearing arranged in said box in alinement with said bearing on said end; a supporting bracket for said inner bearing secured to the side walls of said box whereby said bearing is supported clear of the bottom of the box; an axle arranged in said bearing with its inner end projecting through the inner bearing; and means for retaining said axle in said bearings arranged on the inner end thereof.

8. The combination with a grain box, comprising an end, of a bearing on said box end; an inner bearing arranged in said box in alinement with said bearing on said end; an axle arranged in said bearings with its inner end projecting through the inner bearings; means for retaining said axle in said bearings arranged on the inner end thereof; a dust cap for said inner bearing adapted to inclose said retaining means; and a housing for said axle arranged between said bearings and carried thereby.

9. The combination with a grain box, comprising an end; a bearing on said box end; an inner bearing arranged in said box in alinement with said bearing on said end; an axle arranged in said bearings with its inner end projecting through the inner bearing; and means for retaining said axle in said bearings arranged on the inner end thereof.

10. The combination with a grain box, comprising an end; a bearing on said box end; an inner bearing arranged in said box in alinement with said bearing on said end; an axle arranged in said bearing with its inner end projecting through the inner bearing; means for retaining said axle in said bearings arranged on the inner end thereof; and a dust cap for said inner bearing adapted to inclose said retaining means.

11. The combination with a grain box, of a bearing at the end of said box; an inner bearing arranged in said box; an axle adapted to be reversed in said bearings arranged therein, with its inner end projecting through the inner bearing, its outer end being adapted to receive a wheel; means for retaining said axle in said bearings arranged in the inner projecting end thereof; a dust cap for said inner bearing adapted to inclose said retaining means; and a housing for said axle arranged between said bearings.

12. The combination with a grain box, of a bearing at the end of said box; an inner bearing arranged in said box; an axle adapted to be reversed in said bearings arranged therein, its outer end being adapted to receive a wheel; and a housing for said axle arranged between said bearings.

13. The combination with a grain box, of a bearing at the end of said box; an inner bearing arranged in said box; an axle; and a housing for said axle arranged between said bearings.

14. The combination with a pair of bearings, of an axle of uniform diameter from end to end, having a transverse hole through each end thereof, whereby either end may be arranged in said bearings; a retaining pin for said axle arranged through the hole in the inner end thereof; a dust cap adapted to retain said pin; and a tubular housing for said axle arranged between said bearings and carried thereby.

15. The combination with a grain box, of a bearing at the end of said box; an inner bearing arranged in the box; and an axle adapted to be reversed in said bearings arranged therein, its outer end being adapted to receive a wheel, said bearings being spaced so that, when the axle is reversed, new parts thereof are brought into the bearings.

In witness whereof, I have hereunto set my hand and seal in the presence of two witnesses.

CHARLES L. FOWLE. [L. S.]

Witnesses:
 EVA BURK,
 EDWARD S. MCMASTER.